US009731821B2

(12) United States Patent
Hoareau et al.

(10) Patent No.: US 9,731,821 B2
(45) Date of Patent: Aug. 15, 2017

(54) PACKAGE TRANSPORT BY UNMANNED AERIAL VEHICLES

(71) Applicant: International Business Machines Corporation, Armonk, NY (US)

(72) Inventors: Guillaume Hoareau, Montpellier (FR); Johannes J. Liebenberg, Sandton (ZA); John G. Musial, Newburgh, NY (US); Todd R. Whitman, West Haven, CT (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 381 days.

(21) Appl. No.: 14/482,173

(22) Filed: Sep. 10, 2014

(65) Prior Publication Data
US 2016/0068265 A1 Mar. 10, 2016

(51) Int. Cl.
*B64C 39/00* (2006.01)
*G05D 1/00* (2006.01)
*B64C 39/02* (2006.01)
*G05D 1/10* (2006.01)

(52) U.S. Cl.
CPC .......... *B64C 39/024* (2013.01); *G05D 1/102* (2013.01); *B64C 2201/128* (2013.01); *B64C 2201/145* (2013.01)

(58) Field of Classification Search
CPC combination set(s) only.
See application file for complete search history.

(56) References Cited

U.S. PATENT DOCUMENTS

| 6,665,582 B1 | 12/2003 | Moritz et al. |
| 7,002,472 B2 | 2/2006 | Stratmoen et al. |
| 7,264,204 B1 | 9/2007 | Portmann |

(Continued)

FOREIGN PATENT DOCUMENTS

CN 103274226 A 9/2013

OTHER PUBLICATIONS

Benavidez et al. "Landing of a Quadcopter on a Mobile Base Using Fuzzy Logic" Advance Trends in Soft Computing WCSC 2013, 9 pages.
Danielle Elliot, "DHL testing delivery drones," CBS News, Dec. 9, 2013; 4 pages.
Emily Johnson, "30 Minutes or Less: Drone Delivery Systems," University of Pittsburg, Swanson School of Engineering, 2014, 7 pages.

(Continued)

*Primary Examiner* — Yonel Beaulieu
(74) *Attorney, Agent, or Firm* — Cantor Colburn LLP

(57) ABSTRACT

According to an aspect, an unmanned aerial vehicle (UAV) is provided that is capable of flying between a pick up point and a delivery point with respect to a package transfer operation. The delivery point is identifiable by the UAV through global positioning system (GPS) coordinates of the delivery point and verification of a device identifier of a package docking device (PDD) associated with a package transfer request. A control processor coupled to the UAV receives a transaction packet for the operation that includes the GPS coordinates and the device identifier of the PDD associated with the request. Upon arrival of the UAV at the delivery point, the control processor verifies that a device identifier of a PDD located at the delivery point matches the device identifier in the transaction packet, implements the package transfer operation, and transmits confirmation of completion of the operation to an originator of the request.

17 Claims, 7 Drawing Sheets

(56) References Cited

U.S. PATENT DOCUMENTS

| | | | |
|---|---|---|---|
| 7,394,361 | B1 | 7/2008 | Twitchell, Jr. |
| 8,103,398 | B2 | 1/2012 | Duggan et al. |
| 8,146,854 | B2 | 4/2012 | Lawrence |
| 8,543,265 | B2 | 9/2013 | Ekhaguere et al. |
| 8,686,326 | B1 | 4/2014 | Dennison et al. |
| 9,044,543 | B2 * | 6/2015 | Levien .................. G05D 1/00 |
| 9,359,074 | B2 * | 6/2016 | Ganesh ............... G08G 5/0069 |
| 9,373,149 | B2 * | 6/2016 | Abhyanker ............ G06Q 50/28 |
| 2011/0084162 | A1 | 4/2011 | Goossen et al. |
| 2013/0290234 | A1 | 10/2013 | Harris et al. |
| 2014/0032034 | A1 | 1/2014 | Raptopoulos et al. |
| 2014/0061377 | A1 | 3/2014 | Smith et al. |
| 2014/0136414 | A1 * | 5/2014 | Abhyanker ............ G06Q 50/28 705/44 |
| 2014/0344399 | A1 * | 11/2014 | Lipstone ............... H04L 67/288 709/217 |
| 2016/0068265 | A1 * | 3/2016 | Hoareau ................ G05D 1/102 701/3 |
| 2016/0070260 | A1 * | 3/2016 | Levien .................. G05D 1/00 701/3 |
| 2016/0253907 | A1 * | 9/2016 | Taveira ................. G08G 5/006 701/3 |

OTHER PUBLICATIONS

Eric Kulisch, "Package Wars—Amazon proposes drones to deliver small shipments to customer doors," American Shipper, vol. 56, No. 1, Jan. 2014, 3 pages.

Fulkerson et al., "Automatic Landing Pad" Saluki Engineering Company, May 5, 2011, 61 pages.

Lopez et al. "A Middleware Architecture for Unmanned Aircraft Avionics." Proceedings of the 2007 ACM/IFIP/USENIX International Conference on Middleware Companion. ACM, 2007, 6 pages.

Mohammed et al., "Opportunities and Challenges of Using UVA's for Dubai Smart City", SmartCity 2014 Workshop, IEEE, 2014, 4 pages.

Salazar et al., "Real-time Stereo Visual Servoing Control of an UAV having Eight-Rotors," Published in Electrical Engineering, Computing Science and Automatic Control,CCE,2009 6th International Conference on Oct. 13, 2009, 11 pages.

Yakimenko et al., "Autonomous Aerial Payload Delivery System "Blizzard"," 21st AIAA Aerodynamic Decelerator Systems Technology Conference and Seminar May 23-26, 2011, Dublin, Ireland, 11 pages.

* cited by examiner

PACKAGE TRANSPORT BY UNMANNED AERIAL VEHICLES

BACKGROUND

The present disclosure relates generally to package transport services, and more specifically, to package transport services by unmanned aerial vehicles (UAVs).

UAVs, sometimes referred to as drones, are used for a variety of means such as surveying remote and/or expansive areas, e.g., power lines, pipelines, and wetlands, to name a few.

More recently, the prospect of utilizing UAVs in a commercial setting has been explored. The ability to transport goods to consumers by UAVs offers great value, e.g., in terms of reducing traffic congestion associated with ground transport vehicles, as well as providing the ability to obtain access to areas in which delivery vehicles are limited (e.g., mountainous terrain, remote camping locations, crowded beaches, etc.).

SUMMARY

Embodiments include a package transport system, method, and computer program product for implementing package transport services. A package transport system includes an unmanned aerial vehicle (UAV) capable of flying between a pick up point and a delivery point with respect to a package transfer operation. The delivery point is identifiable by the UAV through corresponding global positioning system (GPS) coordinates of the delivery point and through verification of a device identifier of a package docking device associated with a package transfer request. The system also includes a control processor communicatively coupled to the UAV. The control processor is configured to receive a transaction packet for the package transfer operation. The transaction packet includes the GPS coordinates and the device identifier of the package docking device associated with the package transfer request. Upon arrival of the UAV at the delivery point, the control processor is configured to verify whether a device identifier of a package docking device located at the delivery point matches the device identifier in the transaction packet. Upon determining the device identifier of the package docking device located at the delivery point matches the device identifier in the transaction packet, the control processor is configured to implement the package transfer operation and transmit confirmation of completion of the package transfer operation to an originator of the package transfer request.

Additional features and advantages are realized through the techniques of the present disclosure. Other embodiments and aspects of the disclosure are described in detail herein. For a better understanding of the disclosure with the advantages and the features, refer to the description and to the drawings.

BRIEF DESCRIPTION OF THE SEVERAL VIEWS OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

DETAILED DESCRIPTION

Embodiments described herein can be utilized for unmanned aerial vehicle (UAV)-implemented package transport services. The services enable an end user or consumer to order packages through a host system or service provider. The end user provides global positioning system (GPS) coordinates and vertical scale information for a target package docking device, as well as an identifier of the package docking device to the service provider. In crowded, congested, or highly populated areas, the device identifier and package docking device are particularly useful in providing the ability to distinctly identify the correct person or delivery point, e.g., when a location identified by the GPS coordinates indicates the presence of multiple parties and/or package docking devices. The package docking device communicates with a delivery UAV to receive package deliveries.

The package docking device may be a permanent or semi-permanent structure located at a fixed location or may be a portable device. In one application, a plurality of package docking devices may be installed at a rooftop of an apartment complex in a densely populated city, whereby each apartment tenant is assigned a corresponding package docking device. The package docking devices may include locking mechanisms to secure package deliveries. In this embodiment, the UAV may be configured to receive and use a security key to gain access to the package docking devices. The locking mechanism secures the package thereby enabling package deliveries to occur when a human is not present at the time of delivery. In another embodiment, if the package docking device is a portable device, the UAV may be configured to track any movement of the package docking device in order to complete package transport operations.

It will be understood that the package transport services may also be applied to package pickup/return operations (e.g., those in which the UAV receives a package from an end user's package docking device and transports the package to a return location designated by the service provider). These and other features of the package transport services will now be described.

Figure 1:
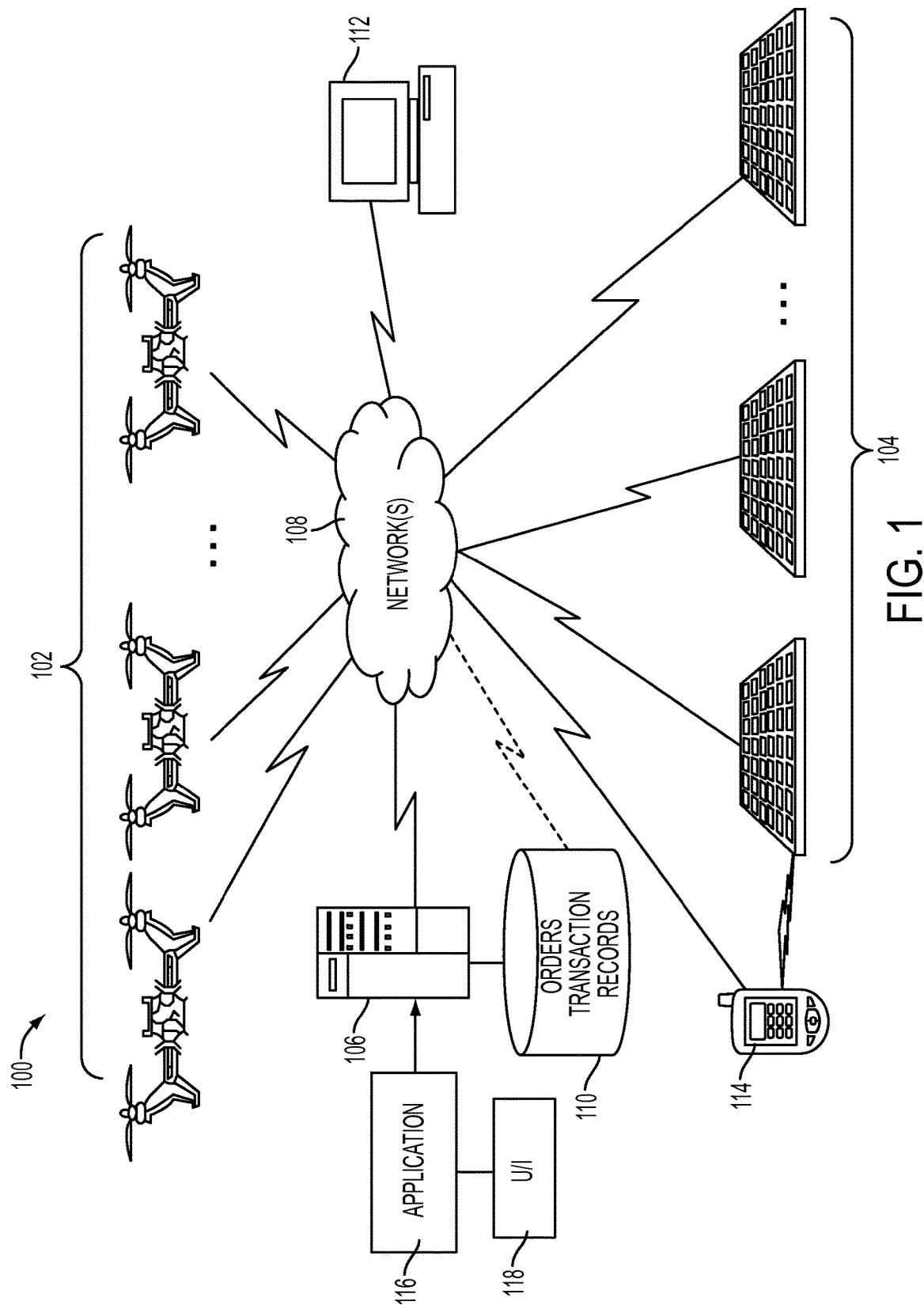
FIG. 1 depicts a high level view of a system for performing package transport services in accordance with an embodiment.

Referring now to FIG. 1, a high level view of a system 100 for performing package transport services is generally shown in accordance with an embodiment. The system 100 includes a plurality of unmanned aerial vehicles (UAVs) 102 and a plurality of package docking devices 104, each of which is communicatively coupled to one or more networks 108. A UAV 102 refers to an unmanned aircraft whose flight is autonomously controlled through onboard computer systems. In an embodiment, a portion of the flight control may be implemented remotely through interaction with a ground station (not shown). The UAVs 102 include physical components and related circuitry configured to pick up, carry, and drop off packages.

The package docking devices 104 refer to structures used in assisting UAVs in implementing corresponding docking functions. A package docking device 104 may be assigned to or otherwise controlled by an end user of the package transport services. A package docking device 104 can be identified by the UAVs based on a unique identifier that is assigned to the package docking device 104 and which identifier is communicatively conveyed to the UAV 102 over a network at the time of a package transfer operation, as will be described further herein. As indicated above, the package docking devices may be permanent or semi-permanent fixed structures or may be portable structures that are lightweight and can be carried by a human.

The networks 108 may be any type of known networks including, but not limited to, a wide area network (WAN), a local area network (LAN), a global network (e.g. Internet), a virtual private network (VPN), and an intranet. The networks 108 may be implemented using wireless networks or any kind of physical network implementation known in the art, e.g., using cellular, satellite, and/or terrestrial network technologies. The networks 108 may also include short range wireless networks utilizing, e.g., BLUETOOTH™ and WI-FI™ technologies and protocols. In one embodiment, the UAVs 102 communicate with the package docking devices 104 over a short-range wireless network, while the UAVs 102 communicate with other network entities, such as the package transport services provider, over a long-range network (e.g., satellite or cellular).

The system 100 also includes a host system computer 106, a personal computer 112, and a mobile device 114, each of which is communicatively coupled to one or more of the networks 108. The host system computer 106 may be implemented as one or more high-speed computer processing devices, such as one or more mainframe computers capable of handling a high volume of activities conducted on behalf of end users of the package transport services. The host system computer 106 implements an application 116 to centrally manage the package transport services described herein. The application 116 includes a user interface 118 that is presented to end users via the personal computer 112 and the mobile device 114. The user interface 118 is described further in FIG. 5.

In one embodiment, the host system computer 106 may be implemented by an entity that sells goods to consumers. Alternatively, the host system computer 106 may be implemented by a third-party service provider that provides the package transport services as an intermediary between the seller entity and the consumers. In another embodiment, the host system computer 106 may be implemented by a non-commercial entity, e.g., for situations in which packages (such as food or medical supplies) need to be transferred between locations as part of an emergency condition where first responders are unable to gain access to various roads or locations. For purposes of illustration, the package transport services are described herein with respect to a commerce application.

The personal computer 112 may be implemented as a general-purpose desktop or laptop computer. An end user consumer may access the user interface 118 of the host system computer 106 via a web browser operating on the computer 112. The end user may order goods from the host system computer 106, as well as schedule delivery of the goods, as will be described further herein.

The mobile device 114 refers to a portable, wireless communications device, such as a smart phone, personal digital assistant, or tablet PC. Similar to the personal computer 112, the end user may access the user interface 118 of the host system computer 106 via a web browser operating on the mobile device 114 to order goods and schedule deliveries. In an embodiment, the mobile device 114 includes a global positioning system (GPS) that enables a UAV 102 to locate a package docking device 104 associated with the mobile device 114, as will be described further herein.

A storage device 110 is coupled to the host system computer 106 and may be alternatively coupled to the host system computer 106 via one or more of the network(s) 108. The storage device 110 stores a variety of data used by the host system computer 106 in implementing the package transport services described herein. As shown in FIG. 1, the storage device 110 stores orders generated for end users, as well as transaction records. The transaction records provide information about completed orders. It is understood that the storage device 110 may be implemented using memory contained in the host system computer 106 or may be a separate physical device. The storage device 110 is logically addressable as a consolidated data source across a distributed environment that includes the networks 108.

The host system computer 106 operates as a database server and coordinates access to application data including data stored in the storage device 110. The host system computer 106 may be implemented using one or more servers operating in response to a computer program stored in a storage medium accessible by the server. The host system computer 106 may operate as a network server (e.g., a web server) to communicate with the personal computer 112 and the mobile device 114 and other network entities.

Figure 2A:
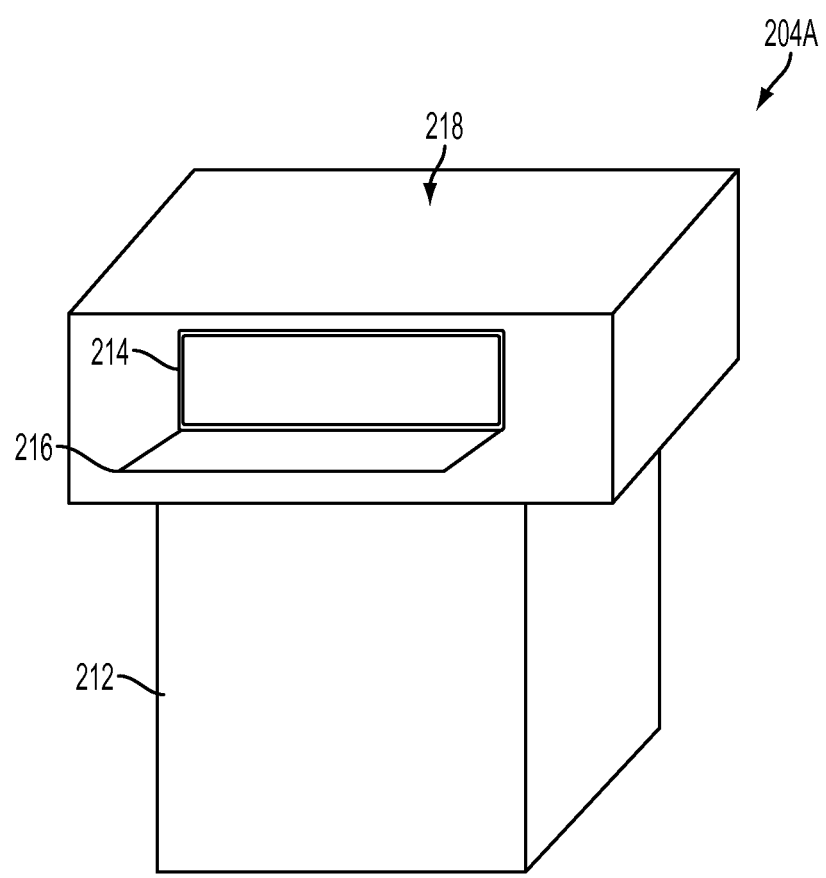
FIG. 2A depicts a perspective view of a package docking device in accordance with an embodiment.
Figure 2B:
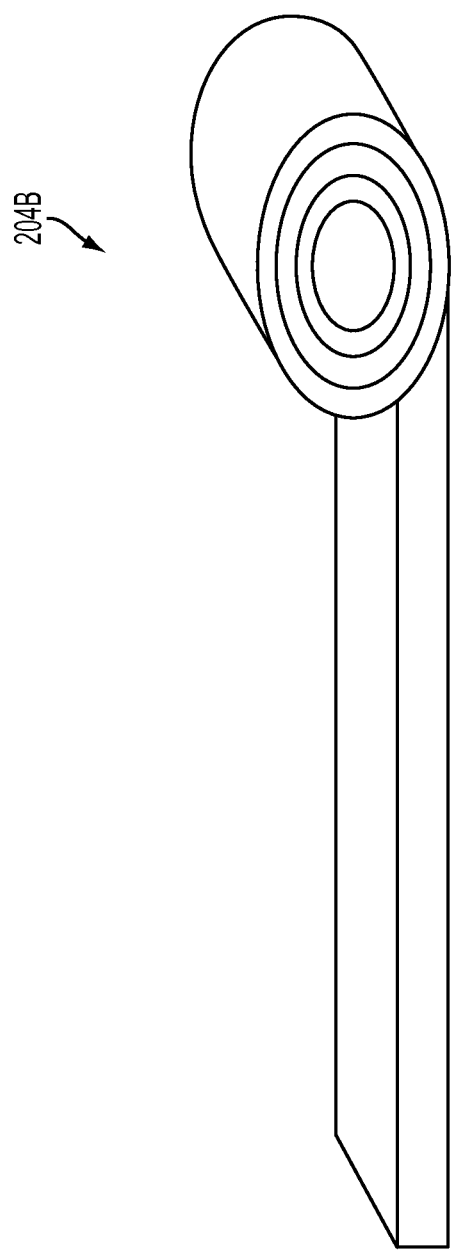
FIG. 2B depicts a perspective view of a portable package docking device in accordance with an embodiment.

As indicated above, the package docking device 104 may be a secured structure that is permanently or semi-permanently installed at a fixed location, such as an area of a real estate, an apartment building rooftop, etc., and is described in FIG. 2A. In an alternative embodiment, the package docking device 104 is implemented as a portable device, which is described in FIG. 2B. Turning now to FIGS. 2A-2B, perspective views of package docking devices 204A and 204B, respectively, will now be described.

The package docking device 204A of FIG. 2A includes a housing 212, an opening 214 for receiving a package, and a door 216 for securing the package in the housing 212. An upper wall 218, or roof, of the housing 212 may be used as a landing site for the UAV. The package docking device 204A may be constructed of a durable material, such as metal, and may be mounted or fixed to another permanent structure (e.g., a building or concrete base) to prevent theft or tampering. The door 216 is closed and locked to secure delivered packages, and may be opened by the UAV 102 using a security key. It will be understood that the configuration shown in FIG. 2A is not limited thereto. For example, in other configurations, the device 204A may have various shapes, sizes, and dimensions. Further, an additional panel or structure may be installed near the opening 214 such that the UAV lands on the panel within a close proximity of the opening 214 to facilitate hand off of the package.

The portable package docking device 204B of FIG. 2B is constructed of a lightweight and flexible material to provide ease of portability. The portable package docking device 204B may be implemented as a substantially flat structure with a thickness that is narrow enough to enable the device 204B to be rolled up for portability and storage. Dimensions of the portable package docking device 204B may vary based on applications of its use. In one non-limiting embodiment, the length and width of the portable package docking device 204B is sized substantially similar to the length and width of a beach towel. Details of the various components of the package docking devices 204A and 204B are described further in FIG. 4.

Figure 3:
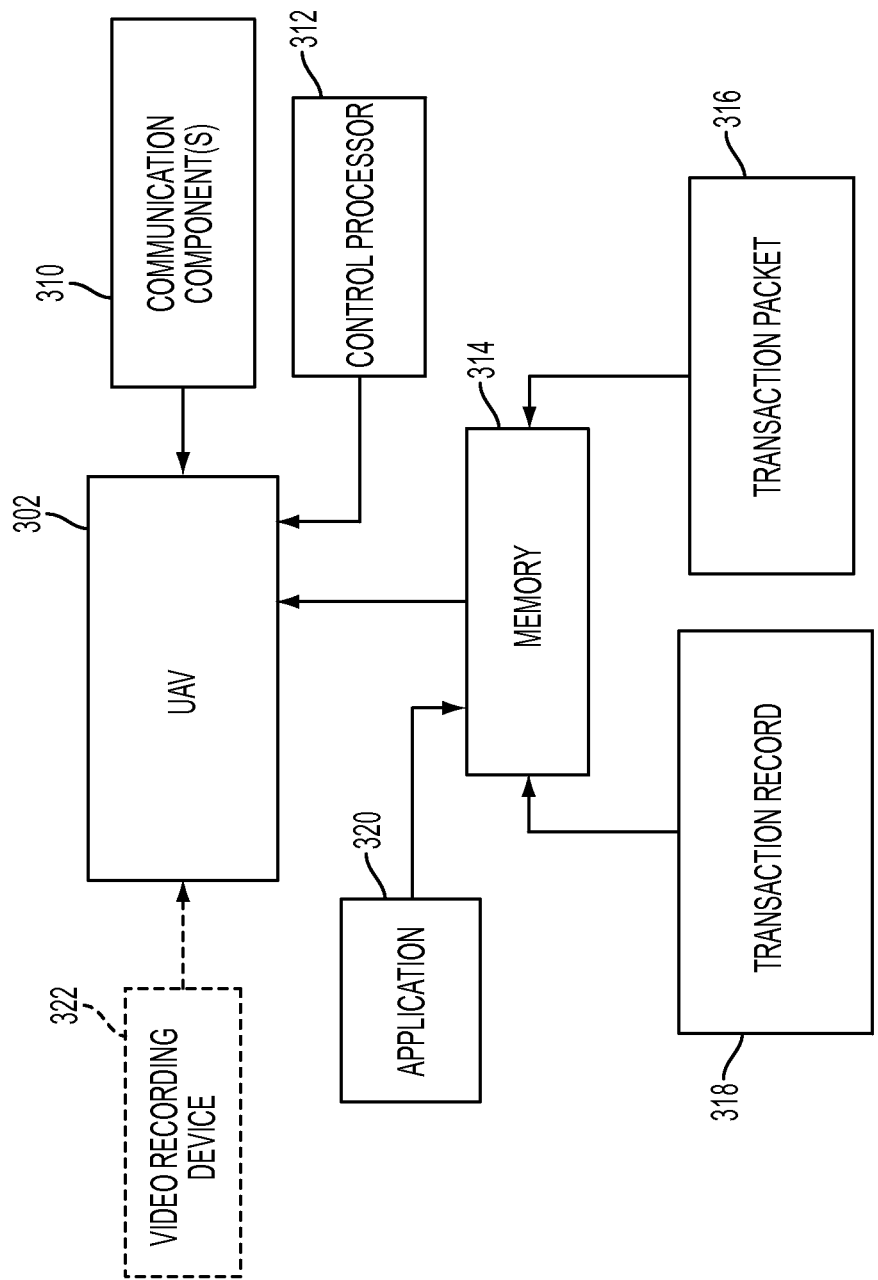
FIG. 3 depicts a block diagram of an unmanned aerial vehicle (UAV) in accordance with an embodiment.

Turning now to FIG. 3, a UAV 302 (102) will now be described in an embodiment. The UAV 302 includes communication components 310, a control processor 312, and memory 314. The memory 314 stores a transaction packet 316, a transaction record 318, and an application 320. The application 320 is executable by the control processor 312 to coordinate the functions of the UAV 302 as described herein. The control processor 312 is communicatively coupled to the circuitry of the UAV 302 to receive operational data from components of the UAV 302, such as data indicating the activation of landing gear or the physical engagement of the landing gear at a package docking device.

The communication components 310 include an antenna configured to receive communications from the host system computer 106 over one or more of the networks 108. The communications may include instructions associated with a package transfer operation. The package transfer operation refers to the pickup and delivery of a package to a target package docking device as defined by GPS coordinates (and vertical scale information that provides altitude data corresponding to the delivery point) and a device identifier of the package docking device 104. The instructions include the GPS coordinates, vertical scale data, and the identifier of the package docking device 104 to which the package will be delivered. The instructions may also include an identification of an order corresponding to the package that differentiates between orders placed for two or more items by the same consumer. In an embodiment, the instructions may further include individual identification of items within an order. For example, a package may contain a partial order due to weight restrictions placed on the UAV, or because an item is not available at the precise time of transport, or because the items are picked up from multiple geographically-dispersed locations for transport. If a package contains a partial order, the UAV may contain instructions that identify those items of the order that are being transported by the UAV. The instructions may also indicate that the partial order reflects 'x' of 'y' items in an order being delivered. If the package docking system is a secure device, the instructions may also include a security key, as described further herein.

These instructions are conveyed to the UAV 102 from the host system computer 106 as a transaction packet 316. In addition, the communications enabled by the antenna include communications from the UAV 102 to the host system computer 106. For example, upon completing a package transfer operation, the UAV 102 may send associated information (e.g., transaction recording, time/date stamp, etc.) to the host system computer 106, which is stored in the storage device 110 as a transaction record. Alternatively, the information may be stored as the transaction record 318 in the memory 314 of the UAV 302.

The communications components 310 also include an antenna configured to send short-range wireless communications to the package docking device 104. In an embodiment, when the UAV 302 reaches its destination defined by the GPS coordinates, it may send a communication to discover the presence of the package docking device 104. Alternatively, the package docking device 104 may be configured to periodically send out signals to enable its discovery. Once the UAV 302 has discovered the presence of a package docking device 104, the UAV 302 requests the device identifier of the discovered device 104. The device identifier received from the package docking device 104 is compared against the device identifier in the transaction packet 316 to ensure that the package is delivered to the correct package docking device. The communications components 310 may further include an adapter configured to translate radio signals from the package docking device 104 to data that is stored in the memory 314 of the UAV 302.

In an embodiment, the communications components 310 may include WI-FI components that are initiated when no package docking device is discovered, or alternatively, if the device identifier received by the UAV 302 is different than the device identifier in the transaction packet 316. The first scenario may occur if the package docking device has been moved to a new location. The latter scenario may occur if the package docking device has been moved from its location and another package docking device is subsequently placed in that location. The latter scenario may otherwise occur when two package docking devices are located in very close proximity to each other (e.g., within a few feet), such that the GPS coordinates span the physical locations of both package docking devices and the UAV 302 receives the device identifier from the wrong package docking device. In any of these scenarios, the UAV 302 may utilize the WI-FI components to send a signal searching for the package docking device.

Optionally, the UAV 302 may include a video recording device 322 to record package transfer operations. The video recording device 322 may be configured through prompts from the application 320 to begin recording, e.g., when the application 320 receives an indication that the landing apparatus of the UAV 302 has been triggered. The video recording device 322 may be prompted through the application 320 to discontinue recording, when the application 320 received an indication that the package transfer operation (i.e., successful delivery of the package to the package docking device 104) is complete. The recording may be stored as a transaction record 318 in the memory 314 of the UAV 302. In addition, the recording may be transmitted through the communication components 310 to the package docking device 104 if the package docking device 104 is equipped to receive the recording. The transaction record 318 may include other information including a time/date stamp of the delivery, as well as transaction details (e.g., invoicing information, billing and payment information, etc.). In addition, the transaction record 318 may be supplemented with electronic coupons or advertisements for goods offered by the seller or through affiliates of the seller, if desired.

Figure 4:
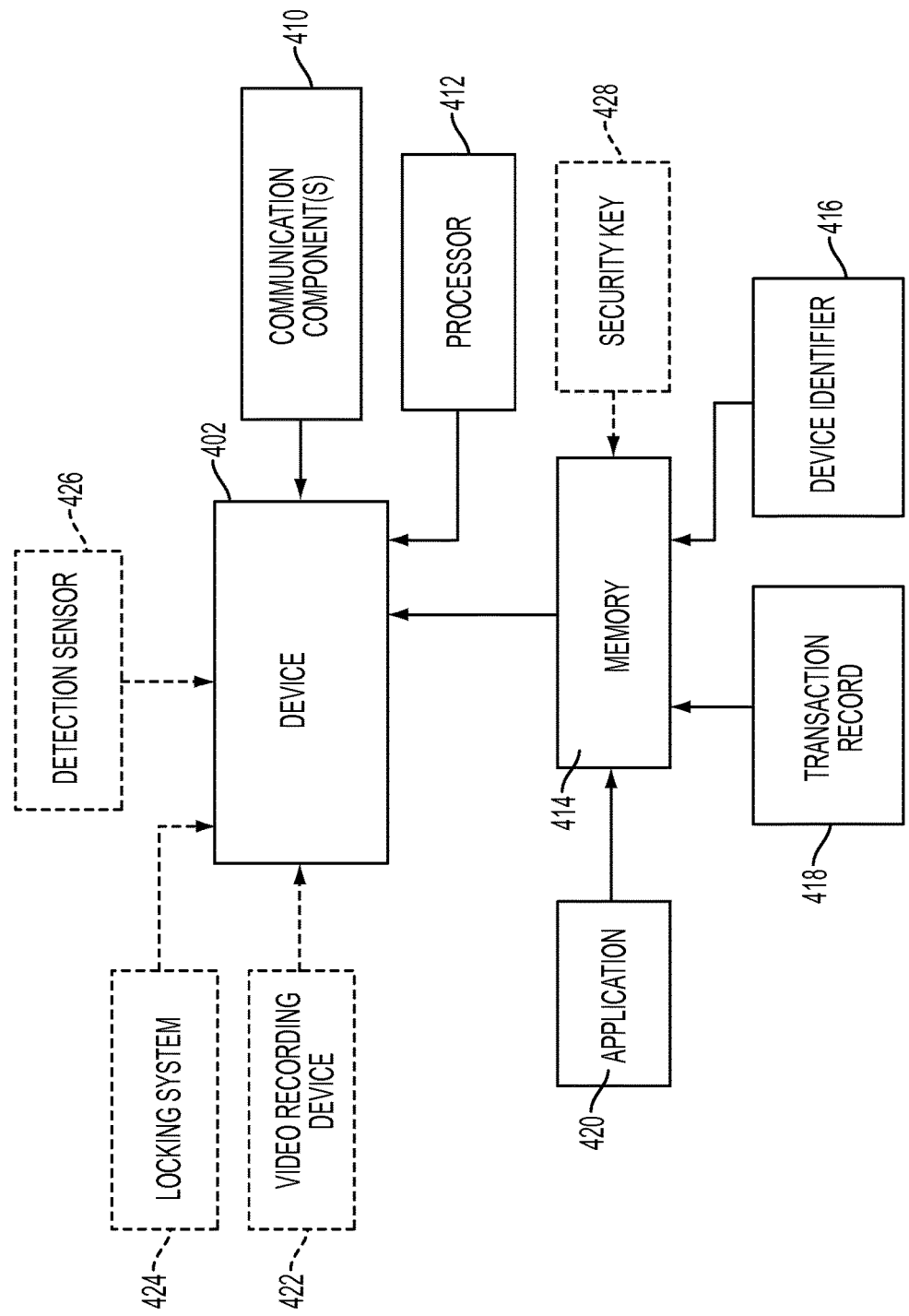
FIG. 4 depicts a block diagram of components of the package docking devices of FIGS. 2A-2B in accordance with an embodiment.

Turning now to FIG. 4, a package docking device 402 (104, 204A, 204B) will now be described. The package docking device 402, whether portable or fixed, includes communication component(s) 410, a processor 412, and memory 414. If the package docking device 402 is a portable device, the communications components 410 may include a GPS device that is used by the UAV 302 to track the location of the package docking device 402. Alternatively, a GPS system on mobile device 114 associated with the package docking device 402 may be used to enable the UAV 302 to track the location of the package docking device 402, assuming that the mobile device 114 is in close proximity with the package docking device 402.

The communication components 410 include an antenna configured to receive communications from the UAV 302 over a short-range network (e.g., BLUETOOTH). For example, the package docking device 402 may receive prompts from the UAV 302 to discover its presence at a GPS location. The package docking device 402 may receive requests for the device identifier 416 of the package docking device 402. Further, upon completing a package transfer operation, the UAV 302 may send associated information (e.g., transaction recording, time/date stamp, etc.) to the package docking device 402, which may be stored in the memory 414 as a transaction record 418.

The memory 414 stores a device identifier 416, a transaction record 418, and an application 420. The application 420 is executable by the processor 412 to coordinate the functions of the package docking device 402 described herein. The device identifier 416 may be a network address of the package docking device 402.

The package docking device 402 may optionally include a video recording device 422 for recording package transfer operations. The video recording device 422 may be disposed at a location on the package docking device 402 suitable for capturing the hand off of the package to the device 402.

If the package docking device 402 is a secured device (e.g., the device 204A of FIG. 2A), the package docking device 402 may include a locking system 424 and a security key 428. The locking system 424 may be implemented as an electronic lock (e.g., using electro-magnetics) using the security key 428 as an authentication means to unlock the device 402. The security key 428 may be provided to the host system 106 as part of the order process.

In an embodiment, the package docking device 402 may include a detection sensor 426 that is configured to detect a landing function of the UAV 302. For example, the detection sensor 426 may be a weight sensor that is disposed on the landing panel (e.g., upper wall or roof 218 of device 204A in FIG. 2A). The detection of weight may indicate to the package docking device that the UAV 302 has landed, and the subsequent absence of weight may indicate the departure of the UAV 302. This information may be stored in the device 402 as part of the transaction record 418.

Figure 5:
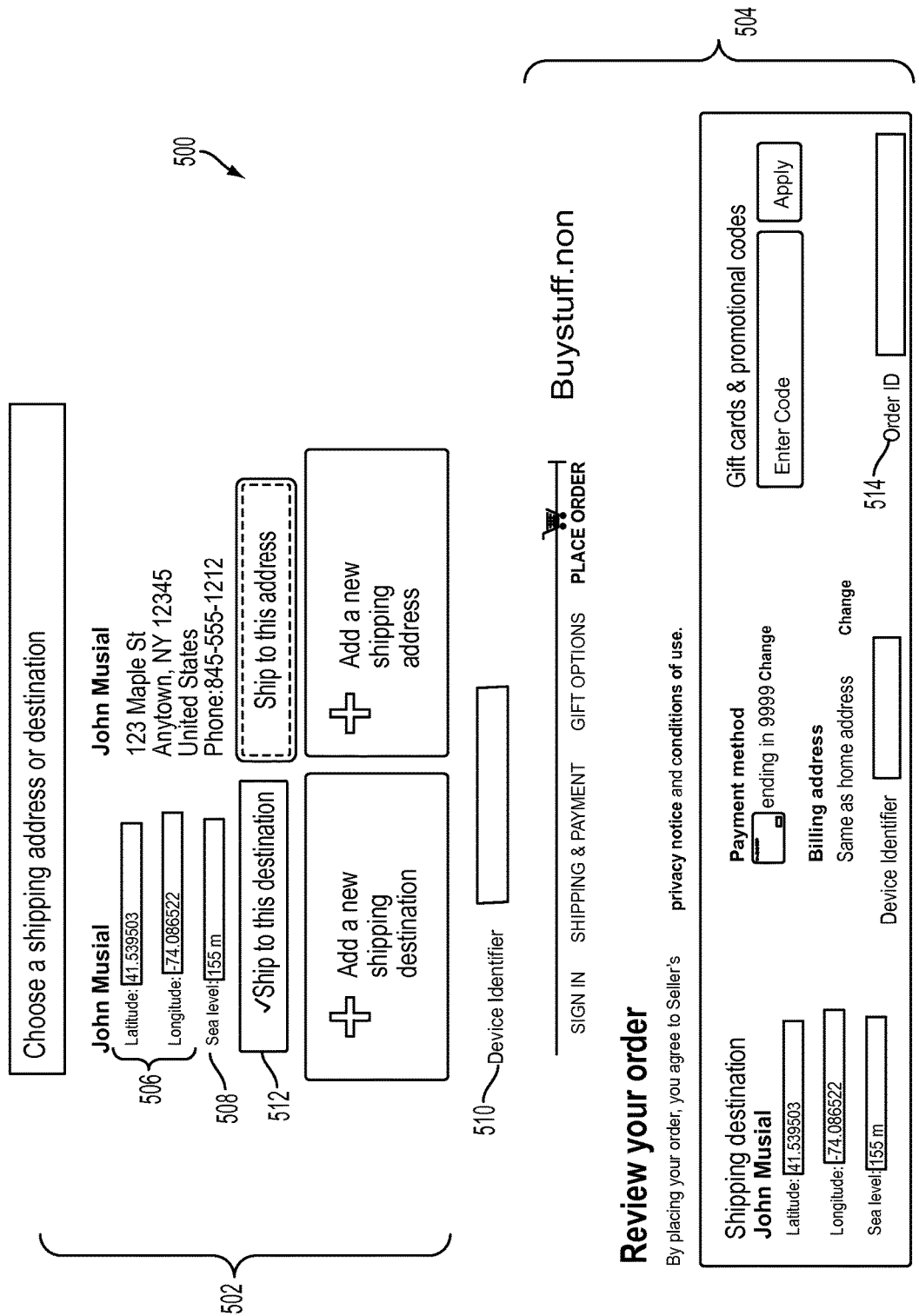
FIG. 5 depicts a user interface for placing and reviewing an order for delivery of a package in accordance with an embodiment.

As indicated above, the package transport services are managed by the host system computer 106. In an embodiment, an end user of the services may access a website of the host system computer 106 and is presented with a user interface 118 for initiating an order for goods offered by the entity associated with the host system computer 106. A sample user interface screen 500 is shown in FIG. 5. An area 502 of the user interface screen 500 is used by the end user to enter order information, and an area 504 of the user interface screen 504 is used by the end user to view the order.

In placing an order, the user is prompted to enter GPS coordinates 506 of the delivery point in which the package is to be delivered. The end user may also enter vertical scale information 508 in the form of the sea level corresponding to the delivery point. In an embodiment, if the order is placed through a mobile device 114, the GPS coordinates of the mobile device 114 may be transmitted to the host system computer 102 and automatically entered in the corresponding fields of area 502. The user further enters a device identifier 510 of the package docking device to which the package will be delivered. The end user then selects an option "Ship to this destination" 512. The user interface screen 500 also includes an option that allows the end user to select a mailing address for the delivery if desired. The review order information 504 provides a summary of the order details including payment and billing information, as well as discounts. The order information 504 may also include an order identifier 514 assigned to the order. Once the order has been placed, the package transport services include providing order details to a designated UAV for implementing a package transfer operation.

Figure 6:
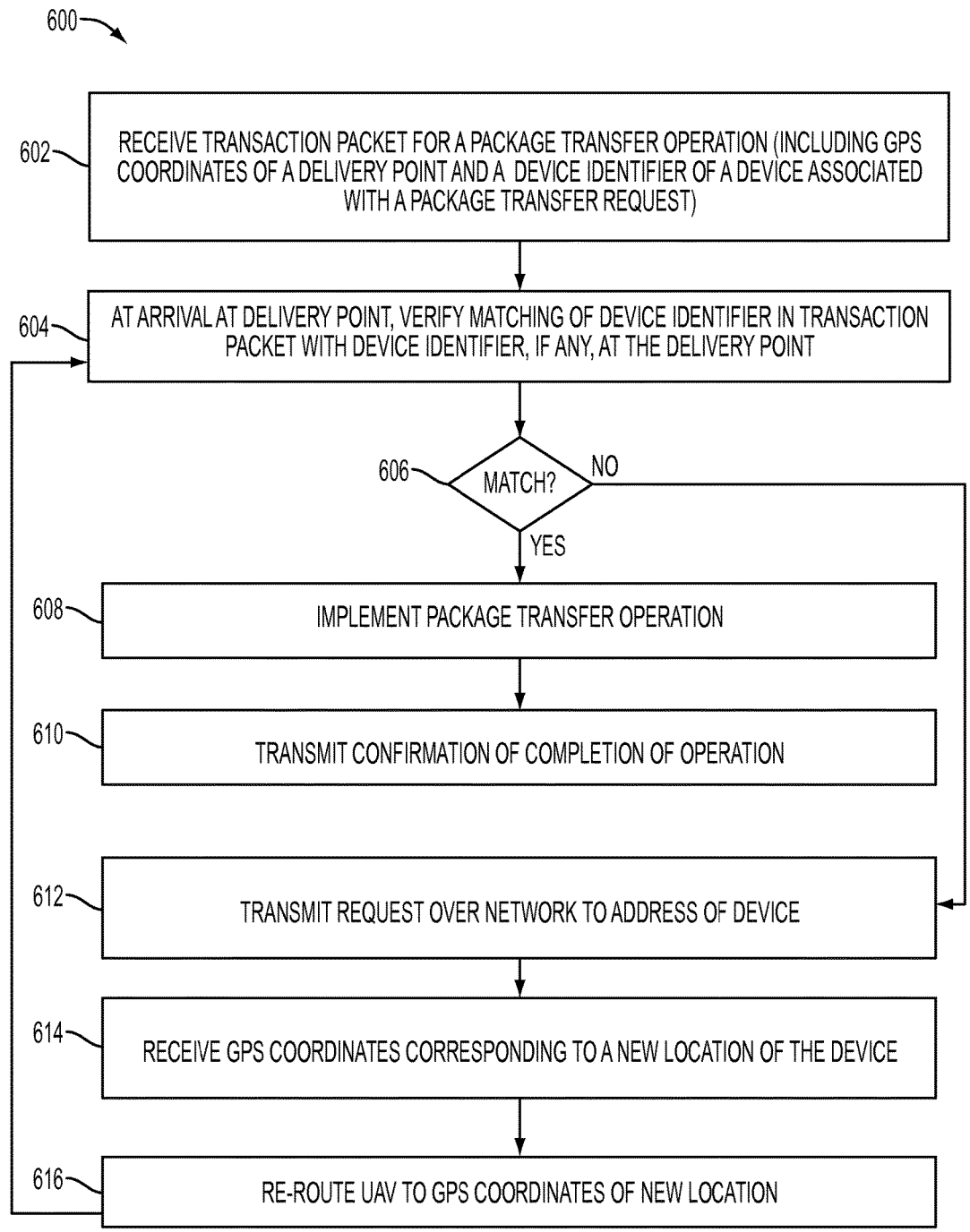
FIG. 6 depicts a flow diagram of a process for implementing package transport operations in accordance with an embodiment.

Turning now to FIG. 6, a flow diagram of a process 600 for implementing the package transfer operations will now be described in an embodiment. The process described in FIG. 6 assumes that the UAV 302 has picked up the package subject to an order placed, e.g., via the user interface screen 500 of FIG. 5.

At block 602, the UAV 302 receives a transaction packet (e.g., packet 316 of FIG. 3) for the package transfer operation. The transaction packet includes the GPS coordinates and the device identifier of the package docking device associated with the package transfer request. The transaction packet may be stored in the memory 314 of the UAV 302.

At block 604, upon arrival at the delivery point as defined by the GPS coordinates and vertical scale information, the application 320 receives a device identifier from a package docking device located at the delivery point and compares the device identifier for the package docking device located at the delivery point with the device identifier stored in the transaction packet 316.

At block 606, the application 320 determines whether the device identifier of the package docking device located at the delivery point matches the device identifier stored in the transaction packet 316. If so, the application 320 directs the UAV 302 to initiate the package transfer operation. The package transfer operation includes a hand off of the package between the UAV and the package docking device. The package transfer operation may also include recording the details of the hand off including the date and time of delivery and/or video recording the hand off.

At block 610, once the operation is completed, the application 320 transmits confirmation of the operation to the end user. This may be implemented using various techniques. For example, the confirmation may be directly transmitted to the package docking device over the wireless network. Alternatively, the confirmation may be transmitted by the UAV 302 over satellite, cellular, or other long-range network to the host system computer 106, which then provides the end user with access to the confirmation. In another embodiment, the UAV 302 may store the confirmation along with other confirmations in its memory 314 and upload the confirmations in a batch process to the host system computer 106 at a designated time.

If, however, the device identifier of the package docking device at the delivery location does not match the device identifier in the transaction packet 316, at block 612, the application 320 directs the communication components 310 to transmit a request over a short-range (e.g., BLUETOOTH or WI-FI) network. The request may include the device identifier, or network address, of the package docking device. Assuming that the package docking device has not moved outside of the range of communication of the UAV, the package docking device having the network address sends a signal indicating its presence at a new location. The package docking device, or alternatively the mobile device associated with the package docking device, may then send updated GPS location information to the UAV at block 614. The UAV is re-routed to the new location based on the updated GPS coordinates at block 616, and process reverts back to block 604.

As indicated above, the package docking device may be a secured system in which a locking system and security key (e.g., locking system 424 and security key 428, respectively, of FIG. 4) is used to gain access to the device. In this embodiment, the process 600 may include additional functions. The control processor 312 may be configured to store the security key associated with the package docking device. In an embodiment, the control processor 312 may be configured to receive an acknowledgement communication from the package docking device upon completion of the package transfer operation indicating the package docking device received the package. In a further embodiment, the control processor 312 may be configured to transmit, upon reaching a pre-defined clearance after departure of the UAV, a request to the package docking device to secure the package by locking the door. In this embodiment, a confirmation of the transaction may be transmitted by the UAV to the package docking device when the UAV receives an acknowledgement that the package is secured.

The embodiments may also include the ability for an end user to configure preferred set of delivery points that specify preferred delivery locations when the end user has provided multiple destinations to which a package may be delivered (e.g., home, office, remote work locations such as when the end user requires an item while at a meeting or otherwise conducting business, outdoor arenas, etc.). In this embodiment, the end user may supply a number of delivery destinations to a package delivery service provider or centralized service, which are maintained in storage by the provider/service, and at the time of purchase or order, may designate which of the destinations is desired for the particular item. If the package delivery provider offers deliveries to more than one of these locations, the provider may inform the end user that the delivery time may be shortened if the end user opts for one destination over another. This delivery time savings may be displayed or presented the end user at the time of the order (e.g., via an option on the user interface screen 500 by way of example).

Technical effects and benefits include the capability of transporting a package, via a UAV, between a package pick up location and a delivery point that is defined by GPS coordinates and a device identifier of a package docking device to which the package will be delivered. The UAV transports packages to both fixed package docking devices as well as portable package docking devices.

The present invention may be a system, a method, and/or a computer program product. The computer program product may include a computer readable storage medium (or media) having computer readable program instructions thereon for causing a processor to carry out aspects of the present invention. The computer readable storage medium can be a tangible device that can retain and store instructions for use by an instruction execution device.

The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A package transport system, comprising:
an unmanned aerial vehicle (UAV) capable of flying between a pick up point and a delivery point with respect to a package transfer operation, the delivery point identifiable by the UAV through corresponding global positioning system (GPS) coordinates of the delivery point and through verification of a device identifier of a package docking device associated with a package transfer request; and
a control processor communicatively coupled to the UAV, the control processor configured to:
receive a transaction packet for the package transfer operation, the transaction packet including the GPS coordinates and the device identifier of the package docking device associated with the package transfer request;
upon arrival of the UAV at the delivery point:
verify whether a device identifier of a package docking device located at the delivery point matches the device identifier in the transaction packet; and
upon determining the device identifier of the package docking device located at the delivery point matches the device identifier in the transaction packet, implement the package transfer operation and transmit confirmation of completion of the package transfer operation to an originator of the package transfer request, wherein the transaction packet further includes an order identification that distinguishes a package subject to the transfer package request from a package that is subject to a different transfer package request from the same originator.

2. The package transport system of claim 1, wherein the transaction packet further includes a security key for unlocking the package docking device associated with the package transfer request, and the control processor is further configured to transmit the security key to the package docking device located at the delivery point prior to implementing the package transfer operation.

3. The package transport system of claim 2, wherein the control processor is further configured to:
record aspects of the package transfer operation;
receive an acknowledgement from the package docking device at the delivery point indicating receipt of the package; and
transmit, upon reaching a pre-defined clearance from the package, a request to the device at the delivery point to secure the package;
wherein transmitting the confirmation is implemented upon receipt by the UAV an acknowledgment that the package is secured.

4. The package transport system of claim 3, wherein recording the aspects of the transfer package operation includes at least one of:
video recording delivery of the package; and
recording a time stamp of delivery.

5. The package transport system of claim 1, wherein the package docking device corresponding to the package transfer request is a portable device, and the control processor is further configured to:
upon determining at least one of:
the device identifier of package docking device located at the delivery point does not match the device identifier in the transaction packet; and
no device identifier is detected by the UAV at the delivery point:
transmit a request over a network to a network address of the package docking device corresponding to the package transfer request;

receive, from the package docking device corresponding to the package transfer request, GPS coordinates corresponding to a new location of the package docking device;
update the transaction packet to include the GPS coordinates of the new location; and
re-route the UAV to the GPS coordinates of the new location;
wherein implementing the package transfer operation includes implementing the package transfer operation at the new location.

6. The package transport system of claim 5, wherein transmitting the confirmation of completion of the package transfer operation to an originator of the package transfer request includes transmitting the confirmation to the originator via the package docking device associated with the package transfer request.

7. A method comprising:
receiving, by a control processor of an unmanned aerial vehicle (UAV), a transaction packet for a package transfer operation, the transaction packet including global positioning system (GPS) coordinates of a delivery point and a device identifier of a package docking device associated with a package transfer request;
upon arrival of the UAV at the delivery point:
verifying whether a device identifier of a package docking device located at the delivery point matches the device identifier in the transaction packet; and
upon determining the device identifier of the package docking device located at the delivery point matches the device identifier in the transaction packet, implementing the package transfer operation and transmitting confirmation of completion of the package transfer operation to an originator of the package transfer request, wherein the transaction packet further includes an order identification that distinguishes a package subject to the transfer package request from a package that is subject to a different transfer package request from the same originator.

8. The method of claim 7, wherein the transaction packet further includes a security key for unlocking the package docking device associated with the package transfer request, the method further comprising transmitting the security key to the package docking device located at the delivery point prior to implementing the package transfer operation.

9. The method of claim 8, further comprising:
recording aspects of the package transfer operation;
receiving an acknowledgement from the package docking device at the delivery point indicating receipt of the package; and
transmitting, upon reaching a pre-defined clearance from the package, a request to the device at the delivery point to secure the package;
wherein transmitting the confirmation is implemented upon receipt by the UAV an acknowledgment that the package is secured.

10. The method of claim 9, wherein recording the aspects of the transfer package operation includes at least one of:
video recording delivery of the package; and
recording a time stamp of delivery.

11. The method of claim 7, wherein the package docking device corresponding to the package transfer request is a portable device, the method further comprising:
upon determining at least one of:
the device identifier of package docking device located at the delivery point does not match the device identifier in the transaction packet; and no device identifier is detected by the UAV at the delivery point:
transmitting a request over a network to a network address of the package docking device corresponding to the package transfer request;
receiving, from the package docking device corresponding to the package transfer request, GPS coordinates corresponding to a new location of the package docking device;
updating the transaction packet to include the GPS coordinates of the new location; and
re-routing the UAV to the GPS coordinates of the new location;
wherein implementing the package transfer operation includes implementing the package transfer operation at the new location.

12. The method of claim 11, wherein transmitting the confirmation of completion of the package transfer operation to an originator of the package transfer request includes transmitting the confirmation to the originator via the package docking device associated with the package transfer request.

13. A computer program product comprising:
a tangible storage medium readable by a processing circuit of an unmanned aerial vehicle (UAV) and storing instructions for execution by the processing circuit to perform a method, comprising:
receiving a transaction packet for a package transfer operation, the transaction packet including global positioning system (GPS) coordinates of a delivery point and a device identifier of a package docking device associated with a package transfer request;
upon arrival of the UAV at the delivery point:
verifying whether a device identifier of a package docking device located at the delivery point matches the device identifier in the transaction packet; and
upon determining the device identifier of the package docking device located at the delivery point matches the device identifier in the transaction packet, implementing the package transfer operation and transmitting confirmation of completion of the package transfer operation to an originator of the package transfer request, wherein the transaction packet further includes an order identification that distinguishes a package subject to the transfer package request from a package that is subject to a different transfer package request from the same originator.

14. The computer program product of claim 13, wherein the transaction packet further includes a security key for unlocking the package docking device associated with the package transfer request, the method further comprising transmitting the security key to the package docking device located at the delivery point prior to implementing the package transfer operation.

15. The computer program product of claim 14, the method further comprising:
recording aspects of the package transfer operation;
receiving an acknowledgement from the package docking device at the delivery point indicating receipt of the package; and
transmitting, upon reaching a pre-defined clearance from the package, a request to the device at the delivery point to secure the package;
wherein transmitting the confirmation is implemented upon receipt by the UAV an acknowledgment that the package is secured.

16. The computer program product of claim 15, wherein recording the aspects of the transfer package operation includes at least one of:
- video recording delivery of the package; and
- recording a time stamp of delivery.

17. The computer program product of claim 13, wherein the package docking device corresponding to the package transfer request is a portable device, the method further comprising:
- upon determining at least one of:
  - the device identifier of package docking device located at the delivery point does not match the device identifier in the transaction packet; and
  - no device identifier is detected by the UAV at the delivery point:
- transmitting a request over a network to a network address of the package docking device corresponding to the package transfer request;
- receiving, from the package docking device corresponding to the package transfer request, GPS coordinates corresponding to a new location of the package docking device;
- updating the transaction packet to include the GPS coordinates of the new location; and
- re-routing the UAV to the GPS coordinates of the new location;
- wherein implementing the package transfer operation includes implementing the package transfer operation at the new location.

* * * * *